US008899501B2

(12) United States Patent
Fox et al.

(10) Patent No.: US 8,899,501 B2
(45) **Date of Patent: *Dec. 2, 2014**

(54) SPRAY GUN WITH PAINT CARTRIDGE

(75) Inventors: Jeffrey D. Fox, Nerstrand, MN (US); Ewald Schmon, Grafenberg (DE); Jens Bros, Ottmarsheim (DE)

(73) Assignee: SATA GmbH & Co. KG, Kornwestheim (DE)

( * ) Notice: Subject to any disclaimer, the term of this patent is extended or adjusted under 35 U.S.C. 154(b) by 916 days.

This patent is subject to a terminal disclaimer.

(21) Appl. No.: 13/042,014

(22) Filed: Mar. 7, 2011

(65) Prior Publication Data

US 2011/0168811 A1 Jul. 14, 2011

Related U.S. Application Data

(63) Continuation-in-part of application No. 12/178,229, filed on Jul. 23, 2008, now Pat. No. 7,922,107.

(51) Int. Cl.

| | |
|---|---|
| ***B05B 1/00*** | (2006.01) |
| ***B05B 1/28*** | (2006.01) |
| ***B05B 7/30*** | (2006.01) |
| ***A01G 25/14*** | (2006.01) |
| ***B05B 7/24*** | (2006.01) |
| ***B05B 1/30*** | (2006.01) |
| ***B05B 7/08*** | (2006.01) |
| *B05B 7/12* | (2006.01) |
| *B05B 7/06* | (2006.01) |

(52) U.S. Cl.

CPC ............. *B05B 1/3046* (2013.01); *B05B 7/2435* (2013.01); *B05B 7/1209* (2013.01); *B05B 7/2408* (2013.01); *B05B 7/066* (2013.01); *B05B 7/2478* (2013.01); *B05B 7/0815* (2013.01); *Y10S 239/14* (2013.01)

USPC ........... 239/600; 239/291; 239/345; 239/376; 239/377; 239/391; 239/DIG. 14

(58) Field of Classification Search

USPC ......... 239/291, 302, 320, 321, 337, 340, 345, 239/346, 375, 376, 377, 378, 379, 390, 391, 239/397, 600, DIG. 14

See application file for complete search history.

(56) References Cited

U.S. PATENT DOCUMENTS 1,703,359 A 10/1925 Paasche
3,236,459 A * 2/1966 McRitchie .................... 239/416

(Continued)

FOREIGN PATENT DOCUMENTS

DE 102004027789 A1 2/2005
DE 102007053855 A1 4/2008

(Continued)

*Primary Examiner* — Ryan Reis

(74) *Attorney, Agent, or Firm* — Thomas J. Nikolai; Nikolai & Mersereau, P.A.

(57) ABSTRACT

A spray paint gun having a disposable cartridge inserted therein such that paint can flow through the cartridge in the spray gun without touching the spray gun. Since no part of the spray gun has paint touching it, there is no cleaning of the spray gun or its components. The cartridges can be easily inserted into the spray gun and easily removed such that different color paints can be used in the spray gun in quick succession without down time for cleaning. There is no use of solvents for cleaning, making the cartridge spray gun environmentally friendly. The disposable cartridges eliminate expensive time consuming cleaning. The cartridges can be breach loaded into the front portion of a spray gun and front portion containing the cartridge can quickly snapped into place and ready for use by a hinged connection to the rear portion or by other connection means. The cartridge may include an integrally formed or otherwise attached gasket member to perfect an airtight seal at a joint in the air passage leading from the gun's handle portion to its spray nozzle.

18 Claims, 7 Drawing Sheets

(56) References Cited

U.S. PATENT DOCUMENTS

| | | | | |
|---|---|---|---|---|
| 3,747,850 | A | 7/1973 | Hastings et al. | |
| 4,562,965 | A * | 1/1986 | Ihmels et al. | 239/346 |
| 4,811,904 | A * | 3/1989 | Ihmels et al. | 239/345 |
| 4,817,872 | A | 4/1989 | Mattson | |
| 5,496,123 | A | 3/1996 | Gaither | |
| 5,617,665 | A | 4/1997 | Hoenig | |
| 5,722,950 | A | 3/1998 | Fujita et al. | |
| 6,012,651 | A * | 1/2000 | Spitznagel | 239/345 |
| 6,056,213 | A | 5/2000 | Ruta et al. | |
| 6,276,616 | B1 | 8/2001 | Jenkins | |
| 6,431,466 | B1 | 8/2002 | Kitajima | |
| 6,585,173 | B2 | 7/2003 | Schmon et al. | |
| 6,796,514 | B1 | 9/2004 | Schwartz | |
| 6,820,824 | B1 | 11/2004 | Joseph et al. | |
| 6,874,702 | B2 | 4/2005 | Turnbull | 239/526 |
| 7,201,336 | B2 | 4/2007 | Blette et al. | |
| 7,922,107 | B2 * | 4/2011 | Fox | 239/600 |
| 2003/0071144 | A1 | 4/2003 | Naemura | |
| 2005/0145724 | A1 * | 7/2005 | Blette et al. | 239/525 |
| 2005/0284963 | A1 | 12/2005 | Reedy | |
| 2006/0065761 | A1 | 3/2006 | Joseph et al. | |
| 2006/0249602 | A1 * | 11/2006 | Wright | 239/600 |
| 2007/0164129 | A1 | 7/2007 | Doner | |
| 2008/0078849 | A1 | 4/2008 | Fox | |
| 2010/0187333 | A1 | 7/2010 | Escoto, Jr. | |
| 2011/0168811 | A1 | 7/2011 | Fox | |

FOREIGN PATENT DOCUMENTS

| | | | |
|---|---|---|---|
| EP | 1340550 | A2 | 1/2003 |
| EP | 1964616 | A2 | 2/2008 |
| WO | WO2009015260 | | 1/2009 |

* cited by examiner

SPRAY GUN WITH PAINT CARTRIDGE

CROSS-REFERENCE TO RELATED APPLICATION

This application is a continuation-in-part of application Ser. No. 12/178,229, filed Jul. 23, 2008.

BACKGROUND OF THE INVENTION

1. Field of the Invention

This invention relates to liquid spray guns and more particularly to spray guns having easy to install replaceable cartridges for delivery of paint without the paint contacting the spray gun.

2. Description of the Related Art

In a typical spray gun, the interior components of the spray gun must be disassembled for proper cleaning and then reassembled for use. This is time consuming and also creates hazardous waste and disposal costs. Along with these inconveniences, unnecessary exposure to toxic vapors and solvents occurs during cleaning.

It is desirable to be able to quickly and easily change the colors used in paint spray guns without having to clean the spray gun each time a different color is used.

It is desired to have a spray gun with a disposable cartridge that shields the gun itself from exposure to paint such that no clean up is required. It is also desirable to eliminate the use of cleaners, such as solvents, with the associated waste which needs to be disposed of.

The cartridge should be easy to use and be quickly insertable and removable from the spray gun body. A spray gun to accommodate such cartridges, that allows quick and easy connections of the pin in the cartridge to the spray gun trigger and to block air flow bypass around the cartridge is also desired.

SUMMARY OF THE INVENTION

The spray gun uses a paint cartridge consisting of a tube with a front conic portion to engage a needle valve member for controlling the paint flow through the cartridge, a rear end having the needle's proximal end extending therefrom and a connection to a paint source to allow paint to flow through the cartridge when a trigger coupled to the needle's proximal end is actuated.

Several methods of loading the cartridge into the spray gun may be employed. In one method the spray gun's cartridge receiving chamber is split and is hinged to allow quick and easy access to insert or remove the cartridge by breach loading the front portion of the hinged spray gun and then locking the cartridge in place when the hinged front portion is made to latch with the rear portion.

In a second method, the cartridge is inserted into the rear of the spray gun and locked in place.

In yet another method, the front and rear portions of the spray gun can be disconnected and then fastened together after a cartridge is installed.

Another method would be a chamber in the spray gun having an aperture for inserting the cartridge and then locking the cartridge in place.

In a split and hinged gun construction, pressurized air for creating the spray condition is applied to the handle portion of the gun and made to flow through a first passage terminating at the location where the spray gun is designed to align with the first passage when the gun's front and rear portions are closed and latched relative to one another. To prevent air leakage at the joint between the two air passages, the replaceable cartridge may be designed to incorporation a gasket appendage that provides a seal at the joint between the two air passages.

By being able to quickly insert a cartridge, the color of the paint being sprayed can be changed without having to clean the spray gun. Further, the spray gun does not have to be cleaned after each use since no paint contacts the spray gun, thus saving cleaning materials and time while eliminating disposal of the cleaning materials and excess paint.

OBJECTS OF THE INVENTION

It is an object of the invention to eliminate the need to clean a spray gun after each use.

It is an object of the invention to eliminate the need for cleaning fluids, cleaning brushes and wipes in readying a spray gun for a next use.

It is an object of the invention to be able to quickly change colors of paint when using the spray gun.

It is an object of the invention to save on clean up time and the costs associated with it.

It is an object of the invention to reduce waste of paint.

It is an object of the invention to reduce down time attributable to clean up and maintenance of spray guns.

Other objects, advantages and novel features of the present invention will become apparent from the following description of the preferred embodiments when considered in conjunction with the accompanying drawings in which like numerals in the several views refer to corresponding parts.

DESCRIPTION OF THE PREFERRED EMBODIMENTS

Figure 1:
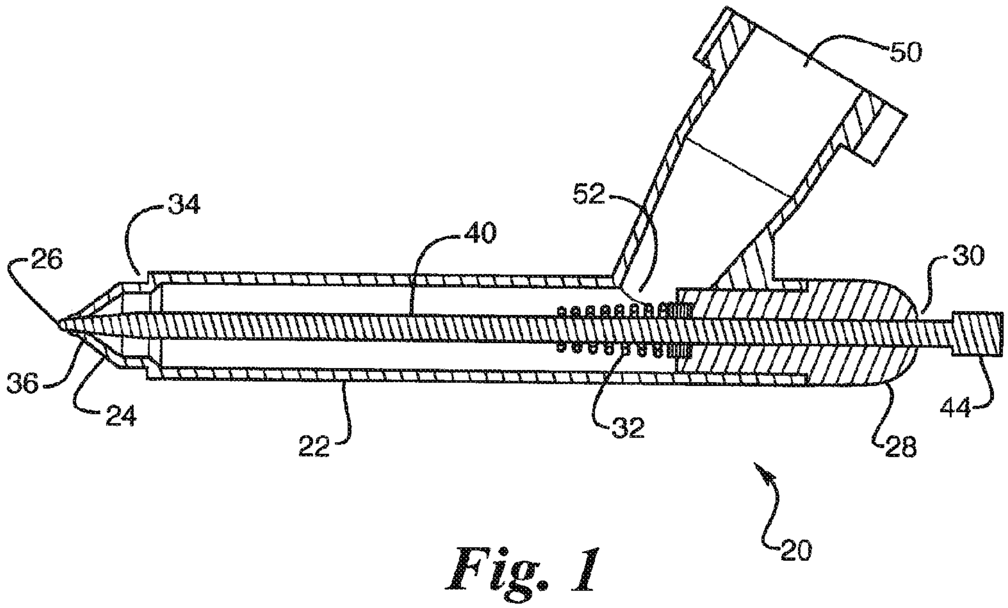
FIG. 1 is a side cross sectional view of a paint cartridge.

A cartridge 20 for a spray gun is shown in FIG. 1. The cartridge 20 has a tubular body 22 and whose front end has a conical nozzle 24 with a concentric aperture 26. Paint may be delivered into the cartridge 20 through a paint supply aperture 52, which is located relatively far from the front end of the tubular body 22. The cartridge 20 also has a rear end 28 with an aperture 30 for allowing a needle valve member 40 to slidably pass therethrough. A spring 32 in the cartridge 20 biases the needle valve member 40 forward to press the pointed leading end 36 thereof into the front aperture 26, blocking it to prevent paint from escaping the tubular body 22. The needle valve member 40 has a knob 44 at the rear end 28 for connection to a trigger 62 on the spray gun 60 for adjusting the position of the needle valve member 40 in the tubular body 22 of the cartridge 20. Applicant's patent application Ser. No. 11/540,747 entitled Disposable Spray Gun Cartridge and filed Sep. 30, 2006 showing a cartridge as may be used in spray gun 60 is hereby incorporated by reference.

Figure 2:
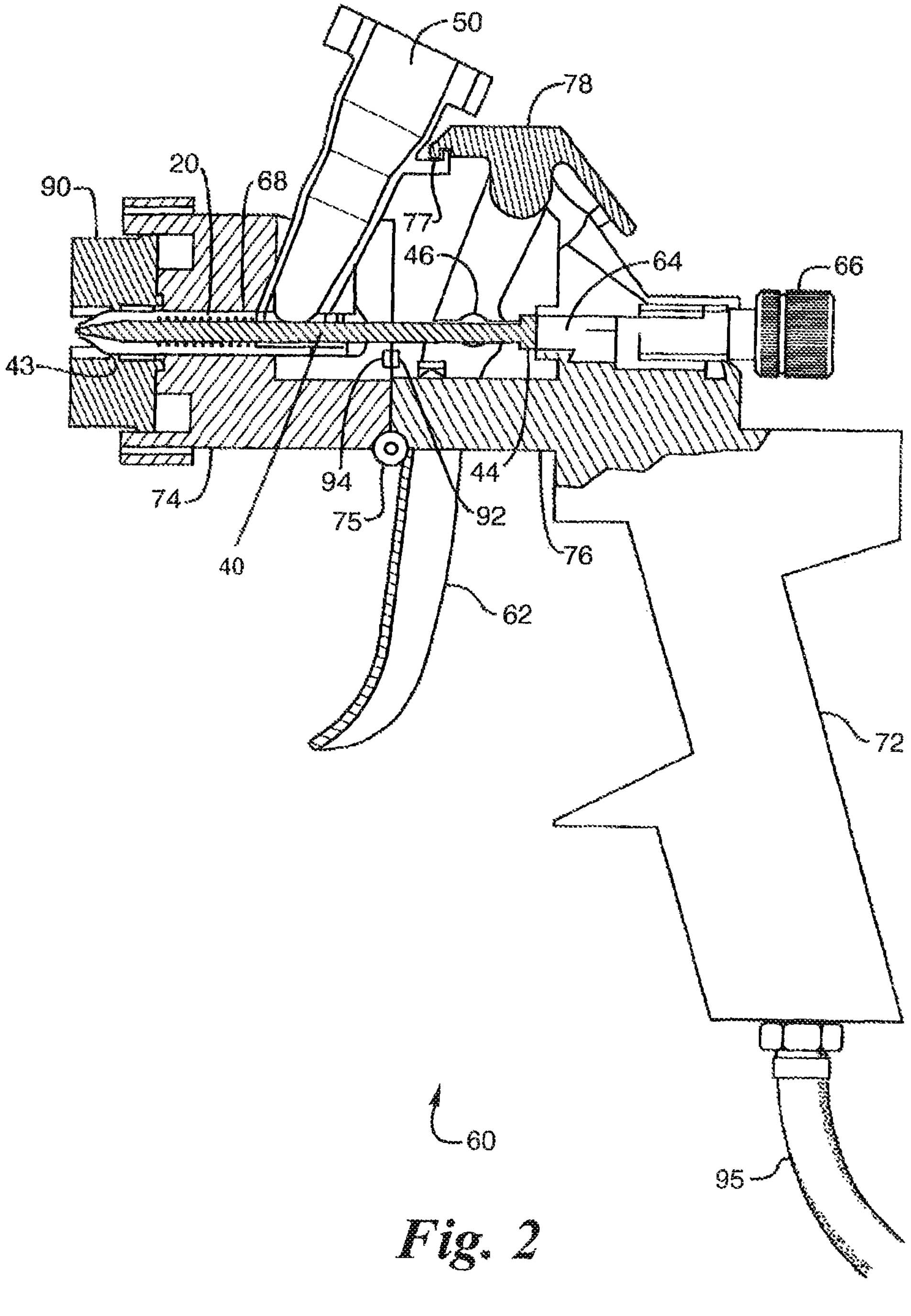
FIG. 2 is a side cross sectional view of a cartridge installed in a hinged spray gun in the closed position.

As illustrated in FIG. 2, a cartridge 20 is shown loaded in a spray gun 60. The spray gun 60 has a trigger 62 which engages the needle valve member 40 to adjust the flow of paint available to be sprayed by the spray gun 60. In the embodiment shown, the trigger 62 has a cradle 46 which the needle 40 rests in. When the trigger 62 is moved aft ward, cradle 46 engages knob 44 on the rear end of the needle valve member 40 and pulls the needle rearward against the force of the spring 32 to open the front aperture 26 allowing paint to flow out therefrom. The spray gun 60 also has a spray limit adjustment stop 64 having a knob 66 for screwing the adjustment stop to a desired position for contacting the rear of knob 44 on needle 40 and limiting the size of the opening of the needle valve member 40 relative to the front aperture 26.

Figure 3:
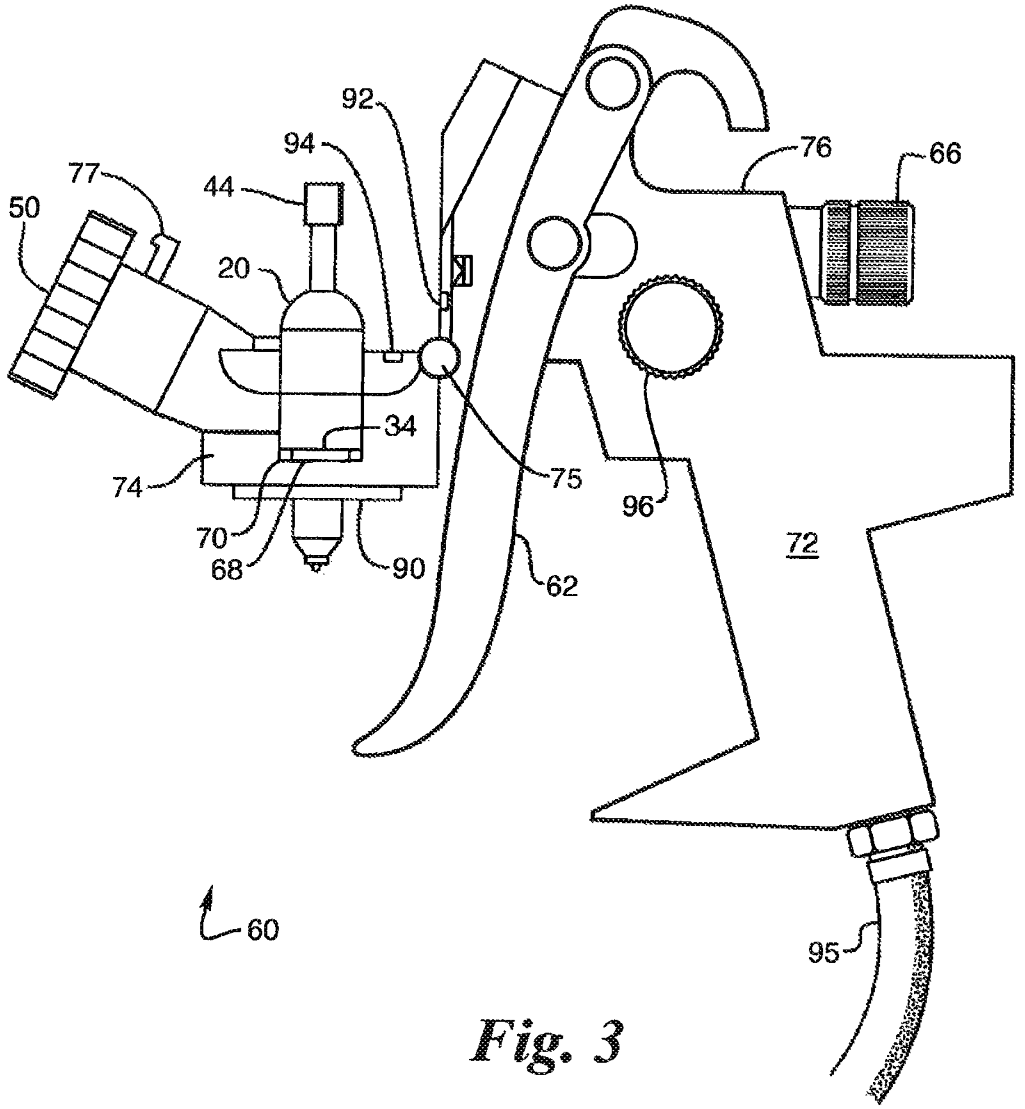
FIG. 3 is a side cross sectional view of a cartridge installed in a hinged spray gun in the open position.

FIGS. 2 and 3 show a hinged embodiment of a breach loading spray gun 60 in accordance with the present invention. The spray gun 60 has a front portion 74, a hinge 75 and a rear portion 76 attached to the front portion by the hinge 75. A cartridge 20 can be inserted into the chamber 68 until the shoulder 34 of the cartridge engages the seat 70 in the front portion 74 of the spray gun 60. When the hinge 75 is operated to close and latch the front portion 74 to the rear portion 76, the cartridge is pushed forward in the chamber 68 by the rear portion 76 such that shoulder 34 is pushed forward until there is a positive stop at seat 70 which creates an air-tight seal between the cartridge 20 and the seat 70, as shown in the embodiment in FIG. 4. Other means for sealing the air inside the spray gun are possible including a tight fit of the cartridge in the cartridge chamber or a seal such as a ring seal 43 as in FIG. 2. The latch, as shown in FIG. 2, comprises a fixed portion 77 and a movable portion 78 which can move up or down to engage or disengage from the fixed portion.

When the spray head assembly 90 on front portion 74 of the spray gun 60 is in place, and the needle valve member 40 is moved by trigger 62, air entrained past the front aperture 26 of cartridge 20 allows for paint to spray from the spray head assembly. The air supply to the spray head assembly 90 is supplied as in any spray gun. For example, it may have air channels which must align, as in air channel 94 in the front portion 74 of the spray gun, to fluidly connect with air channel 92 in the rear portion of the spray gun 76. The air channels 92, 94 may have a close tolerance fit or have seals or have a tube connecting the air channels 92, 94. The air is supplied to the handle 72 through an air hose 95. The air flow control valve knob 96 (as shown in FIG. 3) controls the volume of air delivered to the spray head assembly 90 to control the spray pattern.

Alternatively the air hose 95 may enter the front portion 74 of the spray gun so no air channel connections need be made from the front portion 74 to the rear portion 76.

Figure 4:
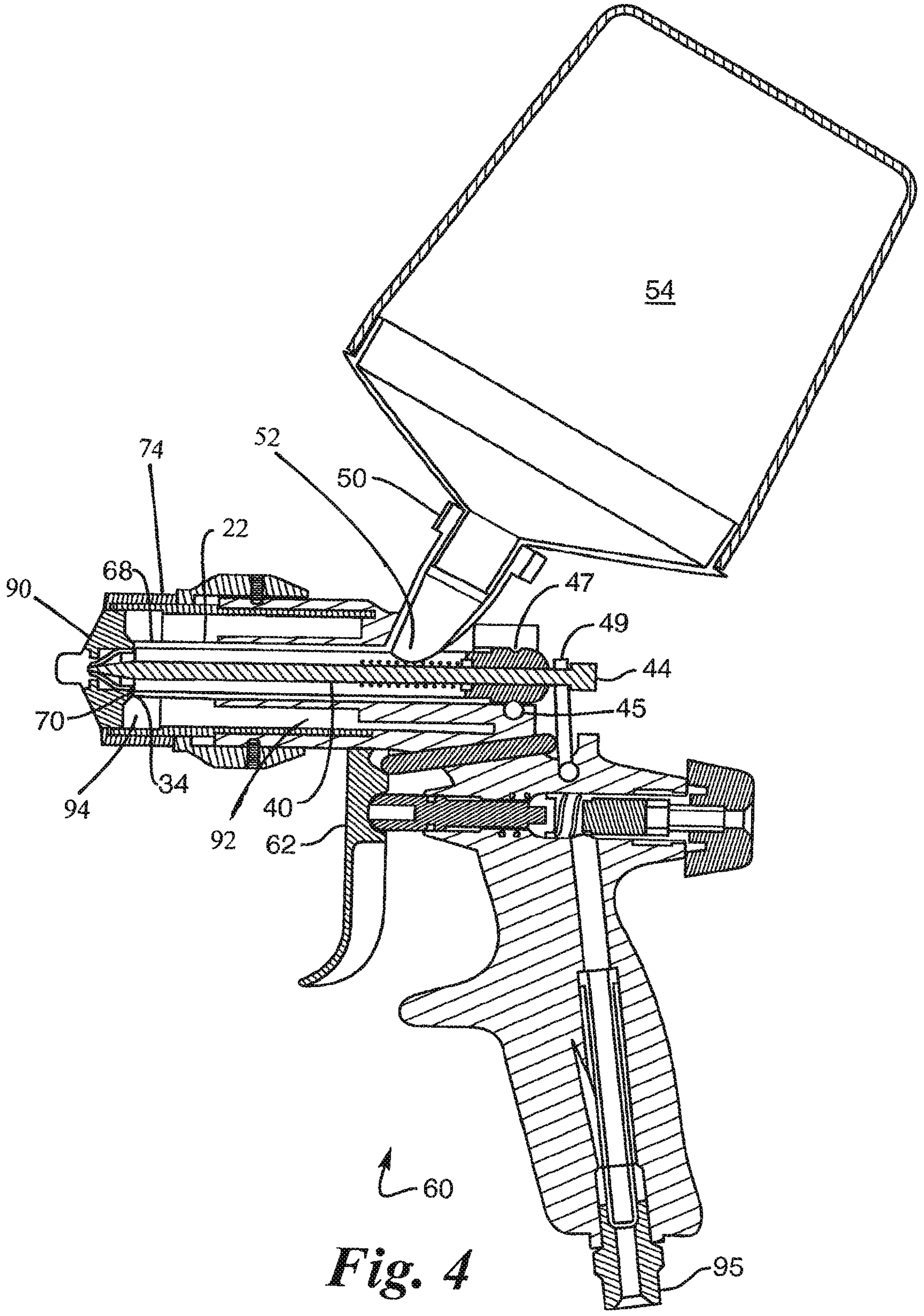
FIG. 4 is a side cross sectional view of a cartridge installed in a rear loading spray gun.

In an alternative embodiment, as shown in FIG. 4, a spray gun has a cartridge 20 having an annular indented portion 47 on tubular body 22 for engaging a pin 45 which is put in place to lock the cartridge 20 into spray gun 60, a collar 49 activated by trigger 62 is then placed on the back of needle valve member 40 adjacent knob 44 to adjust the position of needle 40 and thus regulate the paint flow in the spray gun.

The embodiment shown in FIG. 4 has a reservoir of paint 54 attached to the cartridge 20. The cartridge may have the reservoir screwed on or the reservoir may be integral with the cartridge or may be in any other way connected to the spray gun. Other means of feeding paint to the cartridge through the paint supply aperture 52 are also possible including the use of a hose running to a paint supply. The embodiment of FIG. 4 has air channels 92, 94 similar to the embodiment of FIG. 2.

The various figures show different embodiments of spray guns with different positions of controls and different features to show that many designs for spray guns may be used with the replaceable cartridges of the present invention. Further, many different customized cartridge designs may be used with different commercially available spray guns.

In an alternative embodiment, not shown, the front portion 74 in FIG. 2 may have threads for screwing onto threads on the rear portion 76. In this manner the cartridge may be inserted in the spray gun 60 by unscrewing the front portion from the rear portion, inserting the cartridge and then screwing on the front portion 74.

In other embodiments, the front portion 74 may be attached to the rear portion 76 by latches, bayonet attachments, snaps, screws or other fasteners which may be of many different types.

In a further embodiment, not shown, a chamber inside of a spray gun barrel can be accessed through an opening in the top of the barrel and a cartridge 20 pushed forward into place by a plunger having a handle to push on the plunger and secure the cartridge 20 in the barrel. The cartridge 20 is therefore pushed forward into the chamber much like a bolt action rifle with the plunger acting like the bolt. The needle is then connected to the trigger.

There may be many means of attaching the trigger 62 to the needle valve member 40 such as pins or collars. Moreover, the spring 32 need not be contained within the cartridge but may be external thereto acting between the end cap 28 and a protuberance on the externally projecting needle shaft.

Figure 5:
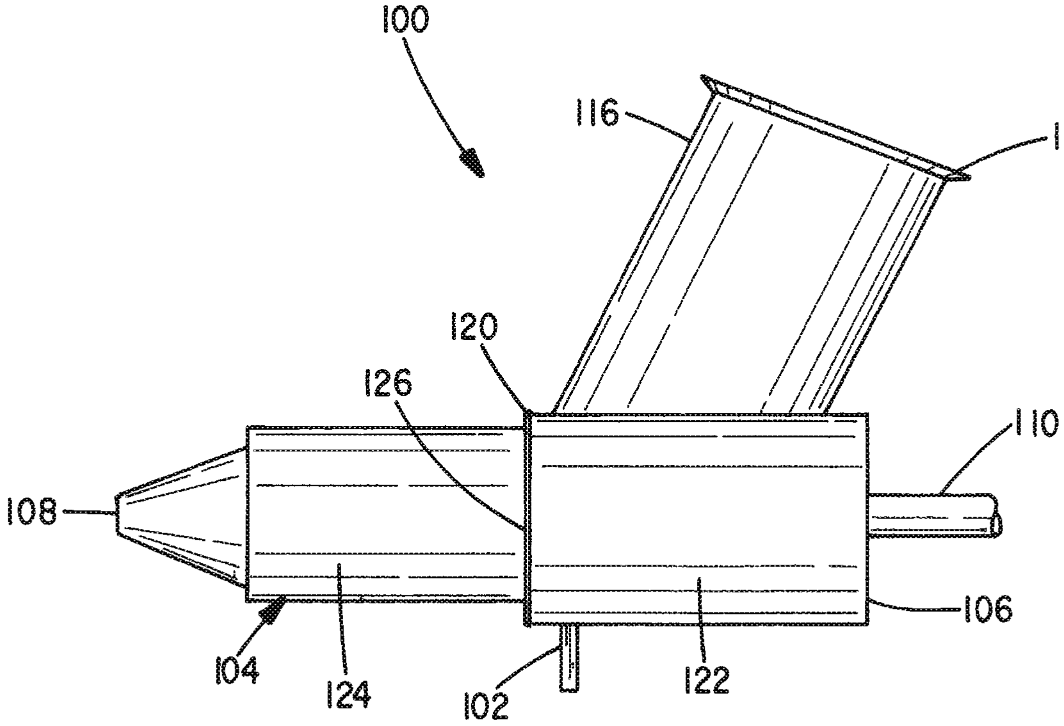
FIG. 5 is a side view of a cartridge for use in the spray gun of FIGS. 2 and 3 and incorporating a gasket.
Figure 6:
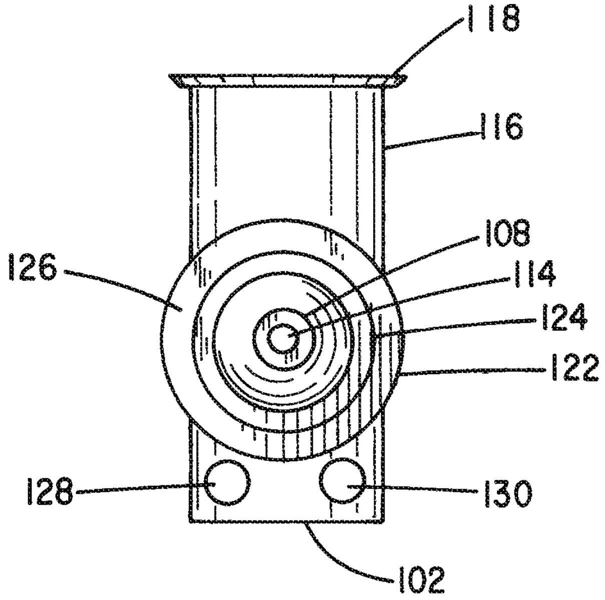
FIG. 6 is a front view of the cartridge of FIG. 5.

Referring to FIG. 5, there is shown a paint cartridge 100 that incorporates a gasket or seal element 102. More particularly, the cartridge 100 comprises a tubular body portion 104 having a proximal end 106, a front end 108 and that at least partially contains a spring biased needle valve member 110. The front end 108 of the needle valve has a taper 112 (FIG. 9) designed to cooperate with a nozzle outlet 114 (FIG. 6) at the front end 108 of the paint cartridge 104. That is to say, the needle valve member 110 can be made to selectively open or close the nozzle outlet 114 when actuated by a trigger mechanism as earlier described in connection with the discussion of FIG. 4.

The cartridge 100 further includes a liquid inlet port 116 in fluid communication with a lumen of the tubular cartridge body portion 104. The port permits a liquid to be sprayed to enter the lumen of the cartridge and may be connected to a liquid supply canister or other tube source of the liquid via a connector 118.

The cartridge 100 of the embodiment of FIG. 5 has an annular shoulder 120 where a larger diameter portion 122 of the cartridge 100 integrally joins to a more nearer portion 124 to the front end 108 of a lesser diameter. Adjacent this shoulder 120 is a first gasket or sealing surface 126 and the radially projecting gasket 102. The gasket 102 includes at least one aperture, and preferably two, at 128 and 130 (FIG. 6) that extend through the thickness dimension thereof. It may be formed from an elastomeric material so as to be slightly compressible, but also could be of the same rigid plastic material from which the body of the cartridge 100 is molded. If not integrally molded with the cartridge body 104, the gasket members 102 and 126 can be formed as a separate piece and placed on the smaller diameter portion 124 and with the gasket 126 against the surface of the shoulder 120 with a friction fit or may be adhesively or otherwise bonded in place.

Figure 7:
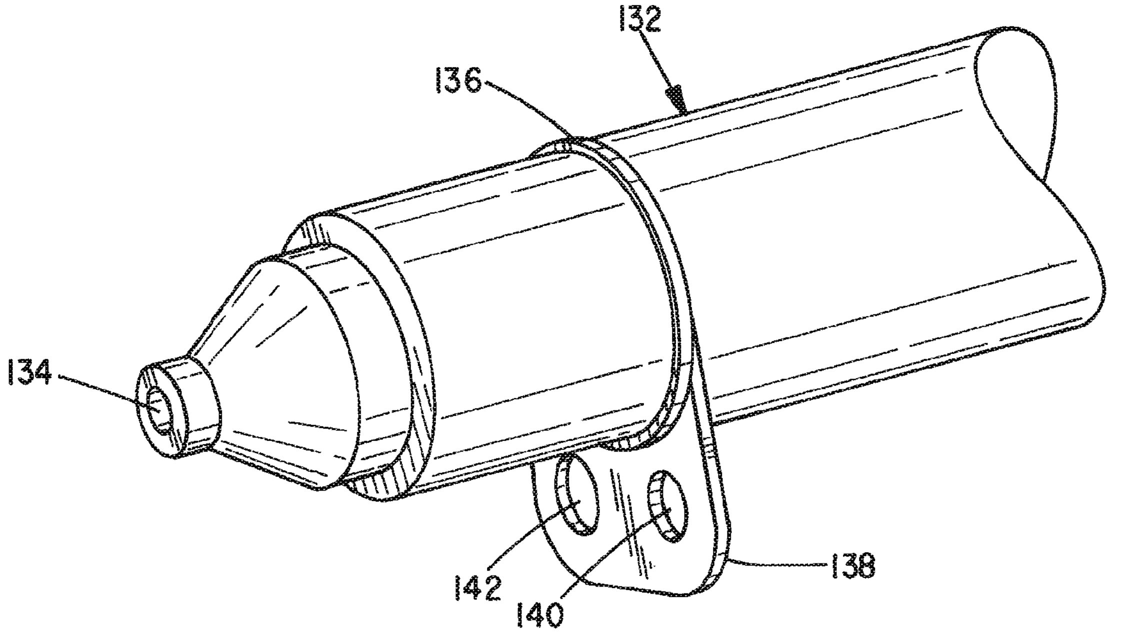
FIG. 7 is a perspective view of an alternative embodiment of a cartridge having a gasket seal.

FIG. 7 illustrates with a perspective view a replaceable cartridge having a slightly different configuration from that shown in FIG. 5. In FIG. 7, the cartridge body 132 again has a nozzle outlet 134 that can be selectively totally or partially occluded by a spring-loaded needle valve as in the earlier described embodiments. Circumferentially mounted at a predetermined location along the length of the cartridge 132 is an annular gasket 136 from which is supported a radially extending gasket member 138. Formed through the thickness dimension of the gasket member 138 are apertures 140 and 142. Again, the material used in forming the gasket may be either flexible or rigid. Furthermore, the gasket member 138 may be integrally formed with the annular gasket 136 or the two may be formed separately and joined using a suitable bonding technique known to those skilled in the art. Otherwise the annular gasket 136 may be plugged on the cartridge body 132 or may slide on the cartridge body 132 It is also contemplated that the annular gasket 136 may be fixed on the cartridge body 132 in an injection molding operation.

Figure 8:
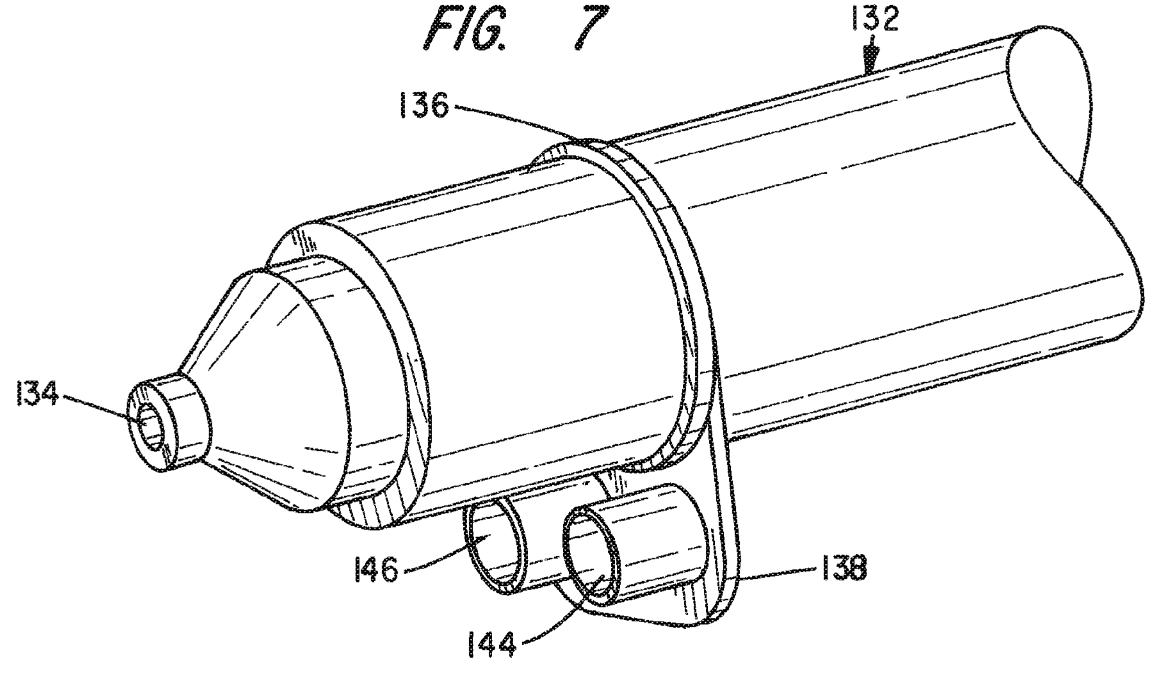
FIG. 8 is a perspective view of the further alternative embodiment of a cartridge having a gasket seal.

The perspective view of FIG. 8 differs only slightly from the embodiment of FIG. 7 in that there are molded in surrounding relation to the apertures 140 and 142 tubular bushings 144 and 146 that project in a frontal direction from the gasket member 138. The tubular bushings 144 and 146 may also be mailed to project in the direction of the proximal end (not shown) of the cartridge body 132. But the first variant is more recommendable because usually the mounting of a cartridge is arranged into the head portion of a spray gun. The tubular bushings 144, 146 may be integrally molded with the gasket member 138 and, as before, the annular seal or gasket 136 may be integrally molded onto the tubular cartridge body 132 or, alternatively, may be assembled as a separate piece onto the cartridge body 132 and then adhesively bonded at a desired predetermined location along the length dimension of the cartridge body.

In the embodiments of FIGS. 7 and 8 the gasket member 138 is of a somewhat rectangular shape. This is recommendable because there are two apertures 140 and 142 and respectively two tubular bushings 144, 146 are present in parallel arrangement. Of course other shapes of gasket member are possible, particularly if only one aperture or bushing would be present or if more then one aperture or bushing are present in a non-parallel arrangement.

Having described the alternative cartridge embodiments of FIGS. 5-8, consideration will next be given to their application in as a replaceable cartridge for a spray gun.

Figure 9:
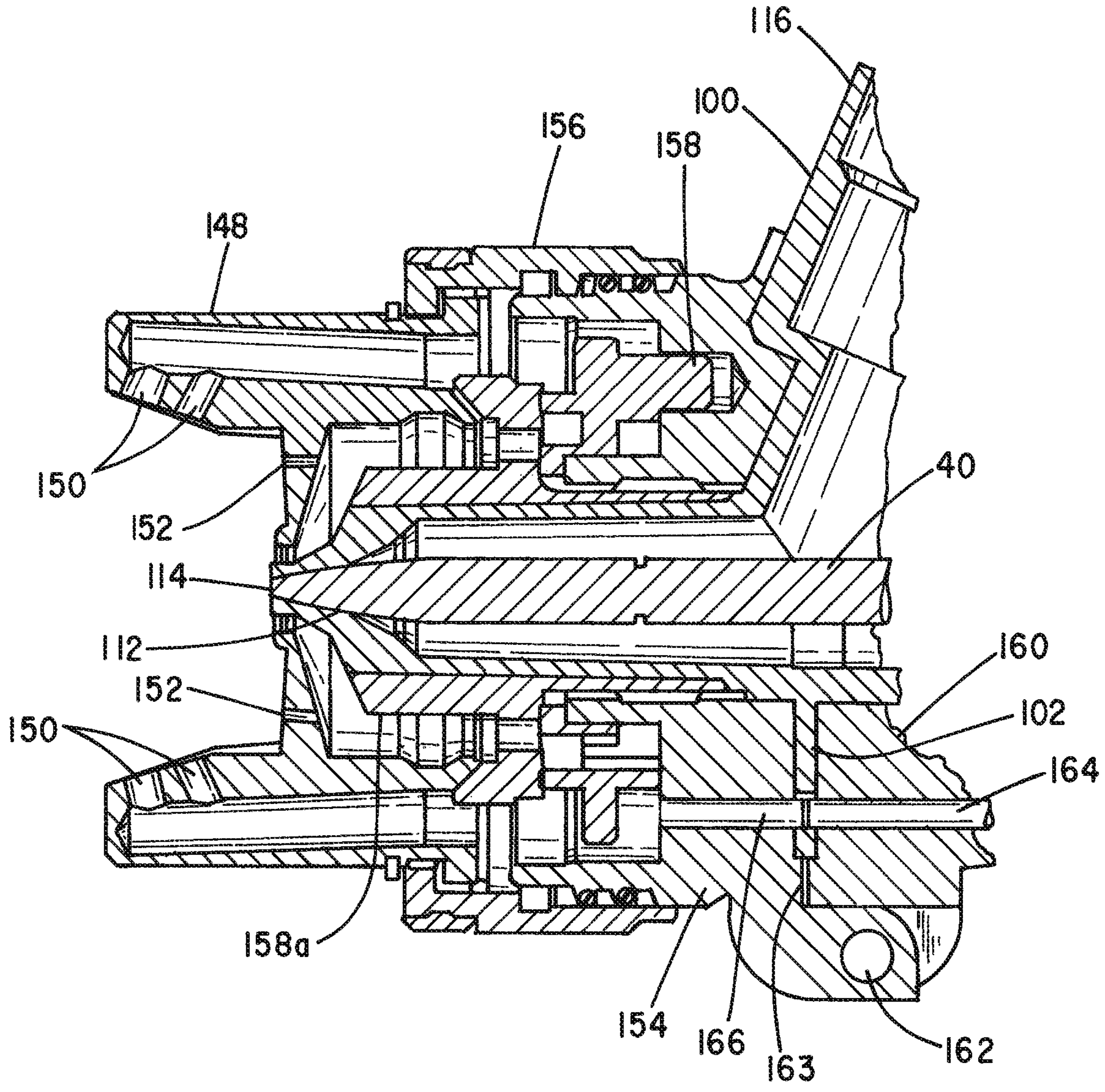
FIG. 9 is a partial longitudinal cross-section view taken through the spray gun with the cartridge of FIG. 5 or 7 installed therein.

Referring to FIG. 9, there is shown a partial cross-sectional view of a spray gun in which the cartridge of FIG. 5 or 7 is adapted to be used.

In FIG. 9, the spray gun's air cap is identified by numeral 148 and is seen to include an annular air passageway having air exit ports at 150 that direct an airstream to air jets exiting the ports 152 on the face of the air cap 148. The air cap 148 fulfills a function similar to the spray head 90 of the embodiments showed in FIG. 2. The air cap 148 is removably secured to the barrel portion 154 of the spray gun by means of a retainer nut 156. This also serves to retain an air distribution ring 158*a* within the barrel portion 154 of the spray gun assembly. The air distribution of the spray gun is realized by a first air distribution element 158 and an air distribution ring 158*a*, which has a central opening and fitted into this central opening is the replaceable cartridge 100 containing the spring loaded needle valve 40 (see FIG. 4, for example). A segment of the handle or rear portion of the gun is identified by numeral 160 in FIG. 9 and is pivotally joined to the front or barrel portion 154 by a hinge pin 162. As has been explained in conjunction with the views of FIGS. 2 and 3, the hinge connection allows the front or barrel portion 154 to assume an open condition relative to the handle portion 160 allowing the cartridge 100 to be inserted into the assembly. The gasket member 102 on the cartridge 100 is designed to be located at the interface between the barrel portion 154 and the handle portion 160 when the two are in their closed relationship with respect to one another while the apertures 128 and 130 are aligned with the air passage 164 in the handle portion and the air passage 166 in the barrel portion to thereby seal the joint therebetween at the interface between the separable halves of the spray gun.

The annular gasket or seal 126 on the cartridge 100 of FIG. 5 becomes captured between the shoulder 120 on the cartridge 100 in FIG. 9 and the wall surrounding the proximal end of the air distribution ring 158*a* so that when the front or barrel portion 154 of the gun is latched closed with respect to the handle portion 160, the annular seal 126 serves to limit any air escape at that interface. Thus, a tight sealing between the cartridge 100 and the air distribution elements 158 and 158*a* of the spray gun is realized.

In the event the gasket arrangement shown in FIG. 8 is employed, the barrel portion 154 is provided with a bore (not shown in FIG. 9) that surrounds the air passage 166 to thereby accommodate the bushings 144 and 146 therein. The bushings 144 and 146 not only serve to conduct the air jet supply lines 164, 166 across the interface and thus be positioning elements but may be used as a throttle member in high volume, low pressure (HVLP) spray guns, for example.

Any type of air flow passages through the spray gun or to the nose of the spray gun may be used so long as the spray head assembly 90 (FIG. 2) or 148 (FIG. 9) is positioned adjacent the cartridge aperture 26 (FIG. 1) or 114 (FIG. 6) to allow paint to be entrained in the air flow such that the spray gun functions properly in adjustment of the spray pattern.

The cartridge 100 having a tube 116 for the paint supply connection may have a threaded connection to a paint reservoir or an integral connection to a paint reservoir or be connected by any other means to a source of paint such as by a hose from a paint can or a paint pump.

Although the above has been described with paint as the fluid delivered by the spray gun, any substance used in spray guns may be delivered by the cartridge.

Obviously, many modifications and variations of the present invention are possible in light of the above teachings. It is therefore to be understood that, within the scope of the appended claims, the invention may be practiced otherwise than as specifically described.

What is claimed is:

1. In combination, a liquid spray gun with a replaceable cartridge, the liquid spray gun having a front barrel portion and a rear handle portion, the front barrel portion having a cartridge receiving chamber, the front barrel portion and the rear handle portion being joined together by a hinge so as to be capable of assuming an open and closed relationship with respect to one another such that the cartridge receiving chamber is accessible for receiving a cartridge therein when the front barrel portion is in the open relationship, the liquid spray gun further including air passages in the front barrel portion and the rear handle portion that are adapted to communicate with one another across an interface when the front barrel portion and the rear handle portion are in the closed relationship;

the paint cartridge having a gasket member affixed thereto for creating a seal to inhibit air leakage at said interface when the front barrel portion and the rear handle portion are in the closed relationship and the cartridge is in the cartridge receiving chamber.

2. The combination of claim 1 wherein the cartridge comprises a tube having a lumen terminating in a nozzle aperture and containing a needle valve reciprocally movable in the lumen for selectively blocking and opening the nozzle aperture.

3. The combination of claim 2 and further including a tube connected to a further aperture in the cartridge leading to the lumen for connecting the cartridge to a source of fluid to be sprayed.

4. The combination of claim 1 wherein the cartridge has a shoulder located at the interface for cooperating with a seat in the cartridge receiving chamber with the gasket member fitting between the shoulder and the seat when the front barrel portion and the rear handle portion are in the closed relationship.

5. The combination as in claim 1 wherein the gasket includes an aperture that aligns with said air passage when the front barrel portion and the rear handle portion are in their closed relationship.

6. The combination of claim 5 and further including a tubular bushing surrounding the aperture and affixed to the gasket.

7. The combination as in claim 5 wherein the gasket is a flexible plastic.

8. The combination as in claim 5 wherein the gasket is a flexible elastomer.

9. The combination as in claim 5 wherein the gasket is an inflexible plastic.

10. The combination as in claim 5 wherein the gasket is integrally molded with the cartridge.

11. The combination as in claim 5 wherein the gasket is formed separate from the cartridge and fitted thereon.

12. The combination as in claim 10 wherein the gasket is free to slide on the cartridge.

13. A paint spray gun assembly comprising:

(a) a front portion;

(b) a rear portion;

(c) a hinge joining the front portion to the rear portion and allowing the front portion to be selectively open and closed relative to the rear portion;

(d) the front portion including a chamber adapted to have a replaceable paint cartridge inserted therein when open with respect to the rear portion, said paint cartridge having a tubular body with a spring-biased needle valve assembly extending through said tubular body, an apex with an aperture there through at a distal end of the tubular body for cooperating with the needle valve assembly, an opening leading to a paint supply and a gasket member suspended from the tubular body;

(e) a spray head assembly supported by said front portion and having an air passage surrounding the apex of the paint cartridge;

(f) the rear portion including a trigger, a handle having a connection attachable to a compressed air supply and a first latch member for releasably mating with a second latch member on the front portion to hold the front portion closed with respect to the rear portion; and (g) latching of the first and second latch members with said cartridge loaded in said front portion bringing the compressed air supply into fluid communication with said air passage through an opening in the gasket member, coupling the trigger to the spring-biased needle valve assembly, and urging the apex of the cartridge into a sealed relation with respect to the spray head assembly, thereby preventing backflow of air between an exterior of the paint cartridge and the chamber.

14. In combination, a liquid spray gun having a chamber and a cartridge adapted to be received in the chamber for shielding the interior of the liquid spray gun from exposure to the liquid to be sprayed, the liquid spray gun including separate pressurized air passages in a handle portion and a barrel portion and where the handle portion and barrel portion are joined by a hinge permitting access to the chamber when the handle portion and barrel portion are open relative to one another, said cartridge comprising:

(a) a tubular body having a spray nozzle outlet at a distal end thereof and containing a longitudinally displaceable needle valve for selectively closing and opening the spray nozzle outlet;

(b) a liquid inlet port in the tubular body; and (c) a gasket member supported by the tubular body at a location to be at a junction between the separate pressurized air passages in the handle portion and the barrel portion when the cartridge is operatively contained in the chamber of the liquid spray gun and the handle portion and barrel portion are closed about the hinge.

15. The combination as in claim 14 wherein the gasket member includes an aperture that aligns with said junction when the cartridge is operatively contained in the chamber of the liquid spray gun.

16. The combination as in claim 14 and further including an open ended tube member aligned with the aperture and affixed to the gasket member.

17. The combination of claim 15 wherein the tube member extends in a direction toward said spray nozzle and serves to accurately position the gasket member at the junction.

18. The combination of claim 15 wherein the tube member serves as an airflow throttle.

* * * * *

UNITED STATES PATENT AND TRADEMARK OFFICE

CERTIFICATE OF CORRECTION

PATENT NO. : 8,899,501 B2
APPLICATION NO. : 13/042014
DATED : December 2, 2014
INVENTOR(S) : Jeffrey D. Fox, Ewald Schmon and Jens Brose It is certified that error appears in the above-identified patent and that said Letters Patent is hereby corrected as shown below:

On the Title Page

In item (75), Inventor Jens Brose's name is misspelled. On the patent it states "Jens Bros" and it should read -- Jens Brose --.

Signed and Sealed this
Twenty-fourth Day of March, 2015

Michelle K. Lee
*Director of the United States Patent and Trademark Office*